March 6, 1928.
A. E. RITTENHOUSE
1,661,268
COMBINED TRANSFORMER AND CONDUIT BOX COVER
Filed May 1, 1926
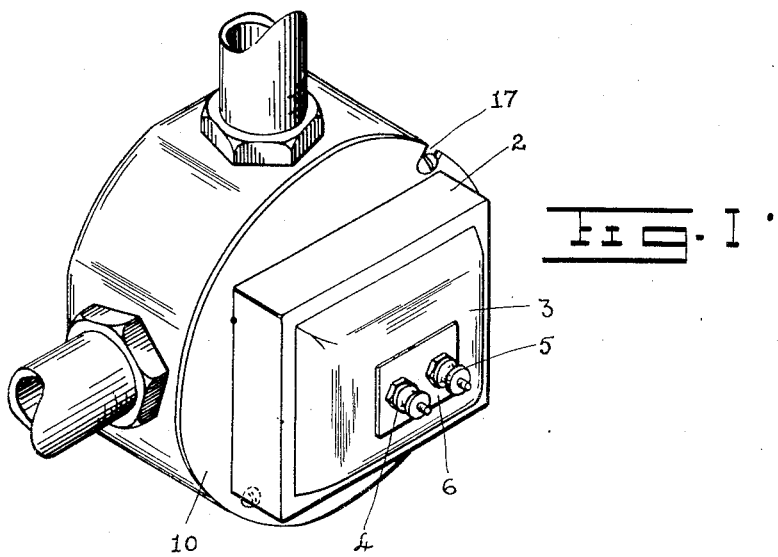
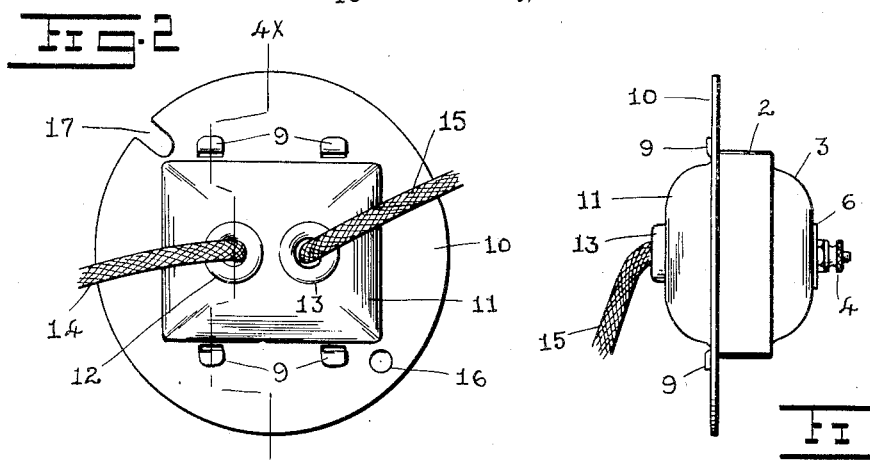
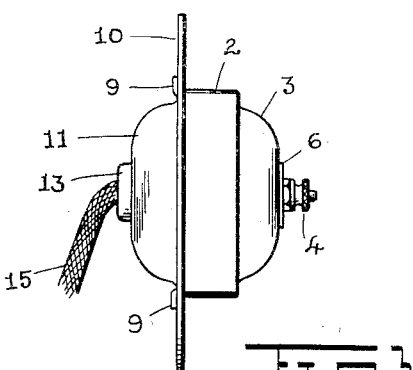
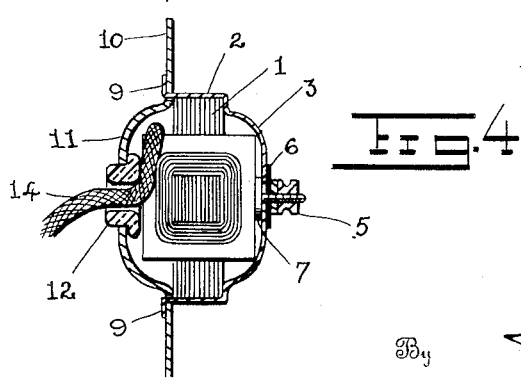
Inventor
Arthur E. Rittenhouse
By Frank Keiper
Attorney Patented Mar. 6, 1928.

1,661,268

UNITED STATES PATENT OFFICE.

ARTHUR E. RITTENHOUSE, OF HONEOYE FALLS, NEW YORK.

COMBINED TRANSFORMER AND CONDUIT-BOX COVER.

Application filed May 1, 1926. Serial No. 106,093. REISSUED

The object of this invention is to combine the cover of a conduit box with a transformer housing so as to provide means whereby the transformer can be readily supported on a conduit box and its electrical connection made solely within the box.

Another object of this invention is to provide a cheap but very practical transformer housing that may be mounted on a conduit box so that the primary winding of the transformer can be connected with very short leads to the wiring within the conduit box.

These and other objects of this invention will be fully illustrated in the drawing, described in the specification and pointed out in the claims at the end thereof.

In the accompanying drawing:

Figure 1 is a perspective view of a conduit box with the combined cover and transformer mounted thereon.

Figure 2 is a rear elevation of the combined cover and transformer.

Figure 3 is an end elevation of the combined cover and transformer.

Figure 4 is a vertical sectional view of the combined cover and transformer, the section being taken on the line $4^x$—$4^x$ of Figure 2.

In the several figures of the drawing like reference numerals indicate like parts.

Transformers especially small ones used for ringing bells, operating signals etc. are at the present time usually mounted in a convenient place and are connected to the wiring in any suitable manner. The primary leads of the transformer are therefore usually exposed and because of the fact that they are permanently connected to the wiring are a constant fire hazard. This may be eliminated by enclosing the exposed wiring in a conduit, but this entails additional labor and expense and unless underwriters' rules require it it is never done.

The combined conduit cover and transformer housing forming the subject matter of my present invention does away with the fire hazard, eliminates special wiring and provides the best possible form of support for the transformer at a usually very convenient point. As illustrated in the figures of the drawing, the transformer 1 consisting of a core having a primary and secondary winding, is mounted within the rectangular metal shell 2. The front 3 of this shell bulges out to make room for the protruding portion of the windings of the transformer and their insulation, and a pair of suitable holes are provided centrally of the bulge in which the terminal posts 4 and 5 are anchored and supported between the insulating strap 6 on the outside of the housing and the insulating washers 7 are supported on the inside thereof.

At the rear of the rectangular shell 2 along the edges thereof are provided the lugs 9, 9. These lugs are adapted to engage and pass thru suitable slots provided in the conduit cover 10 and are bent over against the inside of the cover to securely fasten the casing 2 to the cover. The cover is provided with the depression 11 which forms a bulge identical to the bulge in the front of the casing 2 and provides space within it for the rearwardly protruding portion of the winding and insulation of the transformer. In the depressed or inwardly bulging portion 11 of the cover 10 are provided a pair of holes in which the insulating bushings 12 and 13 are mounted. The primary leads 14 and 15 pass thru these bushings so that the transformer can be electrically connected to the wiring within the conduit box by means of very short leads.

The conduit cover 10 thus forms an annular flange around the transformer by means of which the transformer is clamped to the conduit box. A hole 16 and a slot 17 is provided at diametrically opposite points in the flange thus formed and suitable machine screws are adapted to pass thru this hole and slot to be threaded into the conduit box to close the conduit box by means of the combined cover and transformer.

The wires for operating the bell or signaling apparatus are connected to the terminals 4 and 5 which for this purpose are provided with the thumb nuts so that the connection can be quickly and easily made.

I claim:

1. A combined cover plate for outlet boxes and transformer casing comprising a cover plate provided with a depression centrally of said plate and adapted to receive a portion of the transformer windings to locate said transformer in a predetermined position on said cover plate, a casing covering the remainder of the transformer core and windings and means for fastening said casing to said cover plate to clamp the transformer core and windings in the place in the depression in said cover plate.

2. A combined cover plate for outlet boxes, and transformer casing comprising a cover plate, said plate having a depression therein centrally thereof, said depression being rectangular at its junction with the plate, and rounded at the bottom, a rectangular housing open on one side adapted to receive the core plates of a transformer, and having on the other side a rounded extension symmetrical with the dimensions of the transformer coils, said extension and depression being adapted to receive the windings and connections on each side of the core plates, tongues on said housing adapted to engage with slots in the cover plate to fasten them together.

3. In a transformer housing the combination of a transformer having a core, a cover plate for outlet boxes having a depression therein, said core of the transformer being adapted to rest on the cover plate at the rim of the depression, a casing engaging a portion of said transformer core and adapted to engage the cover plate whereby said plate constitutes a portion of the transformer housing.

4. In a transformer housing, the combination of a transformer having a core, a cover plate for outlet boxes, means for locating said transformer in a predetermined position on said plate, a casing engaging a portion of said transformer core and means carried by said casing to clamp said transformer core in place on said plate in said predetermined position, whereby said plate constitutes a portion of the transformer housing.

5. In a transformer housing, the combination of a transformer, a cover plate for outlet boxes having a depression therein, a casing partially encircling said transformer means for clamping said casing and said transformer in position on said plate over said depression, said plate and casing surrounding and enclosing the transformer between them.

6. In combination an outlet box having an open outer side, a transformer casing, having an open side, a common plate disposed between and closing the open outer side of the outlet box and the open side of the transformer casing, means for securing the transformer casing to the plate, means for securing the plate over the open outer side of the outlet box, a bell ringing transformer in the transformer casing, and insulating bushings mounted in the plate and leading through the plate within the area of the transformer casing for leading relatively high voltage leads from the outlet box and into the transformer casing to the transformer therein independently of the attachment of the transformer casing to the plate.

In testimony whereof I affix my signature.

ARTHUR E. RITTENHOUSE.